United States Patent
Petluri et al.

(10) Patent No.: US 9,867,254 B2
(45) Date of Patent: Jan. 9, 2018

(54) SOLID STATE LIGHTING FIXTURE WITH INCANDESCENT DIMMING CHARACTERISTICS

(71) Applicant: ABL IP Holding LLC, Decatur, GA (US)

(72) Inventors: Raghuram L. V. Petluri, Cerritos, CA (US); Towfiq Chowdhury, Des Plaines, IL (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 14/529,457

(22) Filed: Oct. 31, 2014

(65) Prior Publication Data
US 2016/0128155 A1    May 5, 2016

(51) Int. Cl.
| | | |
|---|---|---|
| G05F 1/00 | (2006.01) |
| H05B 37/02 | (2006.01) |
| H05B 39/04 | (2006.01) |
| H05B 41/36 | (2006.01) |
| H05B 33/08 | (2006.01) |
| F21K 9/00 | (2016.01) |

(52) U.S. Cl.
CPC ..... H05B 33/0857 (2013.01); H05B 33/0815 (2013.01); F21K 9/00 (2013.01); H05B 33/086 (2013.01); H05B 33/0827 (2013.01); H05B 33/0842 (2013.01); H05B 33/0845 (2013.01); H05B 37/02 (2013.01); Y02B 20/346 (2013.01); Y02B 20/347 (2013.01)

(58) Field of Classification Search
CPC ............ H05B 33/0815; H05B 33/0827; H05B 33/0857; H05B 33/0845; H05B 33/086; H05B 33/0842; H05B 37/02; Y02B 20/347; Y02B 20/346; F21K 9/00
USPC ......................................... 315/294, 291, 201
See application file for complete search history.

(56) References Cited

U.S. PATENT DOCUMENTS 6,441,564 B1 * 8/2002 Gu ..................... H05B 41/3928
                                                          315/246
7,288,902 B1    10/2007 Melanson
(Continued)

OTHER PUBLICATIONS

Office Action for Mexican Application No. MX/A/2015/014492, dated May 4, 2017, (Mexican Office Action, 3 pages; English translation, 3 pages).

*Primary Examiner* — Alexander H Taningco
*Assistant Examiner* — Christian L Garcia
(74) *Attorney, Agent, or Firm* — Kilpatrick Townsend & Stockton, LLP

(57) ABSTRACT

A dimmable LED lighting system includes first, second and third types of LED light sources, and an LED driver to control the supply of current on first, second and third channels, respectively to the first, second and third types of LED light sources. The first, second and third types of LED light sources are selected according to their spectral power distribution (SPD) curves. The selected SPD curves together model a dimming color curve that is characteristic of an incandescent light source when the first, second and third types of LED light sources are separately driven with current at predefined power ratios that correspond to dimming levels over a dimming region of the dimming color curve. The dimmable LED lighting system can have a color rendering index $R_a$ greater than 80 over the dimming region.

20 Claims, 14 Drawing Sheets

(56) References Cited

U.S. PATENT DOCUMENTS

| | | | |
|---|---|---|---|
| 8,358,089 B2 | 1/2013 | Hsia et al. | |
| 8,456,109 B1 | 6/2013 | Wray | |
| 8,593,074 B2 | 11/2013 | Hatley et al. | |
| 8,742,695 B2 * | 6/2014 | Wray | H05B 33/0818 315/185 R |
| 2007/0285434 A1 * | 12/2007 | Lin | G06F 7/4818 345/600 |
| 2008/0297027 A1 * | 12/2008 | Miller | H05B 33/0812 313/498 |
| 2011/0043137 A1 * | 2/2011 | Negley | H05B 33/086 315/297 |
| 2012/0236553 A1 | 9/2012 | Cash | |
| 2015/0264773 A1 * | 9/2015 | Bowers | H05B 33/0863 315/131 |
| 2015/0382425 A1 * | 12/2015 | Lewis | H05B 33/0869 315/307 |
| 2016/0018069 A1 * | 1/2016 | Van Dreumel | H05B 33/0857 |

\* cited by examiner

TABLE A

| Ratio of signal strength in each channel (Power Ratios) | | | Result | | | | | | |
|---|---|---|---|---|---|---|---|---|---|
| Ch-1 | Ch-2 | Ch-3 | x | y | CCT | duv | Ra | R9 | Normalized flux |
| 1.00 | 0.00 | 0.00 | 0.4368 | 0.4043 | 3002.96 | 0.121 | 82.87 | 20.48 | 1.000 |
| 0.89 | 0.11 | 0.00 | 0.4417 | 0.4051 | 2929.81 | -0.224 | 83.2 | 24.19 | 0.868 |
| 0.71 | 0.29 | 0.00 | 0.4498 | 0.4065 | 2814.01 | -0.6 | 83.66 | 29.68 | 0.747 |
| 0.61 | 0.39 | 0.00 | 0.4549 | 0.4074 | 2745.98 | -0.764 | 83.89 | 32.69 | 0.630 |
| 0.44 | 0.56 | 0.00 | 0.4637 | 0.4089 | 2633.65 | -0.92 | 84.18 | 37.3 | 0.444 |
| 0.29 | 0.71 | 0.00 | 0.4729 | 0.4105 | 2527.35 | -0.914 | 84.36 | 41.23 | 0.293 |
| 0.14 | 0.86 | 0.00 | 0.4817 | 0.412 | 2431.49 | -0.76 | 84.41 | 44.34 | 0.183 |
| 0.00 | 1.00 | 0.00 | 0.4913 | 0.4137 | 2335.8 | -0.45 | 84.34 | 47.01 | 0.130 |
| 0.00 | 0.77 | 0.23 | 0.5022 | 0.4129 | 2218.14 | -0.77 | 84.53 | 47.18 | 0.071 |
| 0.00 | 0.57 | 0.43 | 0.5126 | 0.4121 | 2114.17 | -0.865 | 84.48 | 46.49 | 0.049 |
| 0.00 | 0.47 | 0.53 | 0.5186 | 0.4116 | 2057.98 | -0.829 | 84.34 | 45.77 | 0.031 |
| 0.00 | 0.23 | 0.77 | 0.5334 | 0.4105 | 1928.77 | -0.481 | 83.68 | 43.08 | 0.010 |
| 0.00 | 0.00 | 1.00 | 0.5503 | 0.4092 | 1798.4 | 0.357 | 82.36 | 38.67 | 0.005 |

FIG. 3D

TABLE B

| Wavelength (nm) | (Power Ratios) | | | | | | |
|---|---|---|---|---|---|---|---|
| | 3000K | 1800K-90 | pc-Amber | Result | | | |
| | Ch-1 | Ch-2 | Ch-3 | CCT | duv | Ra | R9 |
| 3000 | 0.86 | 0.00 | 0.14 | 2956.59 | 2.29 | 90.34 | 58.29 |
| 2900 | 0.83 | 0.08 | 0.08 | 2939.6 | 1.94 | 92.02 | 67.45 |
| 2800 | 0.75 | 0.08 | 0.17 | 2818.58 | 1.06 | 90.06 | 55.55 |
| 2700 | 0.69 | 0.15 | 0.15 | 2747.11 | 0.41 | 90.57 | 57.63 |
| 2600 | 0.62 | 0.23 | 0.15 | 2646.37 | -0.38 | 90.66 | 57.36 |
| 2500 | 0.54 | 0.31 | 0.15 | 2543.42 | -1.08 | 90.62 | 56.57 |
| 2400 | 0.46 | 0.38 | 0.15 | 2438.37 | -1.68 | 90.42 | 55.19 |
| 2300 | 0.38 | 0.46 | 0.15 | 2331.5 | -2.14 | 90.01 | 53.15 |
| 2200 | 0.31 | 0.56 | 0.13 | 2234.05 | -2.53 | 90.54 | 55.27 |
| 2100 | 0.22 | 0.67 | 0.11 | 2106.55 | -2.7 | 90.07 | 53.31 |
| 2000 | 0.17 | 0.75 | 0.08 | 2029.43 | -2.74 | 90.44 | 54.67 |
| 1900 | 0.10 | 0.90 | 0.00 | 1941.32 | -2.89 | 92.94 | 63.99 |
| 1800 | 0.00 | 1.00 | 0.00 | 1791.42 | -2.04 | 90.73 | 55.16 |

FIG. 11

SOLID STATE LIGHTING FIXTURE WITH INCANDESCENT DIMMING CHARACTERISTICS

FIELD

The present disclosure is related to an LED lighting system and method with incandescent style dimming characteristics.

BACKGROUND

Incandescent light sources have been used for many years in lighting fixtures. An incandescent light source, such as an incandescent light bulb, includes a filament, which when heated emits light. The filament in the incandescent bulb typically emits a light with a color temperature of about 3000 Kelvin (K) at full brightness, which is considered a "white" color. As the incandescent light source is dimmed by decreasing current, the filament emits a light that shifts away from a cooler color temperature, e.g., "white", toward a warmer color temperature, such as yellow, orange, and then red. The color temperature change of an incandescent light bulb generally follow the color change of a cooling black body, i.e., a black body locus. An example of a dimming color curve for an incandescent light source, such as a halogen light source, is shown in FIG. 1.

Light Emitting Diodes (LEDs) have begun to replace traditional incandescent light sources in lighting fixtures. LEDs are efficient and reliable, and are able to emit a bright white light. Blue LEDs with a phosphor coating are typically used to produce white light. However, unlike traditional incandescent bulbs, the color temperature of an LED does not significantly change when the LED is dimmed. For example, when dimmed, the white light from an LED does not appear red but instead can become even more bluish.

One way to simulate the dimming characteristic of an incandescent lamp with an LED light source is to optically mix white LEDs with amber (e.g., yellow/orange) LEDs, and to control their currents in such a manner that the mixed color light from the LED combination changes from white tight to a more amber-yellow-white color with dimming. Traditionally, LED systems performing mixing of colored LEDs use individual drivers to control each colored LED separately, or use a single driver designed to have two or more separate output channels, where each output channel is controlled individually within the driver. An example of such a circuit is described in U.S. Pat. No. 7,288,902 to Melanson.

SUMMARY

A dimmable LED lighting system and method are provided in which three or more LED light sources with different spectral power distribution (SPD) curves are selected to model a dimming color curve, such as for an incandescent light source (e.g., a black body locus curve). For example, the dimmable LED lighting system includes first, second and third types of LED light sources and an LED driver to selectively supply current to each of the LED light sources on first, second and third channels, respectively. The three types of LED light sources are selected according to their SPD curves, which together model a dimming color curve that is characteristic of an incandescent light source when the LED light sources are driven by the LED driver at predefined power ratios that correspond to dimming levels over a dimming region of the dimming color curve. The different types of LED light sources may be selected according to maximum (e.g., peak) and minimum (e.g., valley) profiles of their SPD curves, e.g., spectral power versus wavelength.

Accordingly, a dimmable LED lighting system can be designed and manufactured using a combination of three or more types of LED light sources with selected SPD curves to provide a custom dimming color curve that can offer a high general color rendering index (CRI) of Ra over a dimming region. For example, the dimmable LED lighting system can be configured with an Ra greater than 80. Moreover, the dimmable lighting system can be configured with an Ra greater than 90 over the dimming region with one of the three types of LED light source on one channel having an Ra greater than 90 and the other two types of LED light sources on the other channels having an Ra less than 90 (e.g., 80<Ra<90). The dimmable lighting system can also be configured to have a value of R9 greater than 50 over a dimming region even though the different types of LED light sources have a value of R9 less than 50.

BRIEF DESCRIPTION OF THE DRAWINGS

FIG. 3D illustrates a Table A showing exemplary power ratios (based on simulations) to drive respective channels for the first, second and third types of LED light sources with corresponding SPD curves of FIGS. 3A, 3B and 3C, along with other related data, such as x, y, CCT, duv, Ra, R9 and Normalized flux.

FIG. 11 illustrates a Table B showing exemplary predefined power ratios (based on simulations) to drive respective channels for the first, second and third types of LED light sources of the LED lighting system, along with other related data such as CCT, duv, Ra and R9, in accordance with a second embodiment.

DETAILED DESCRIPTION OF THE EXAMPLE EMBODIMENTS

Figure 1:
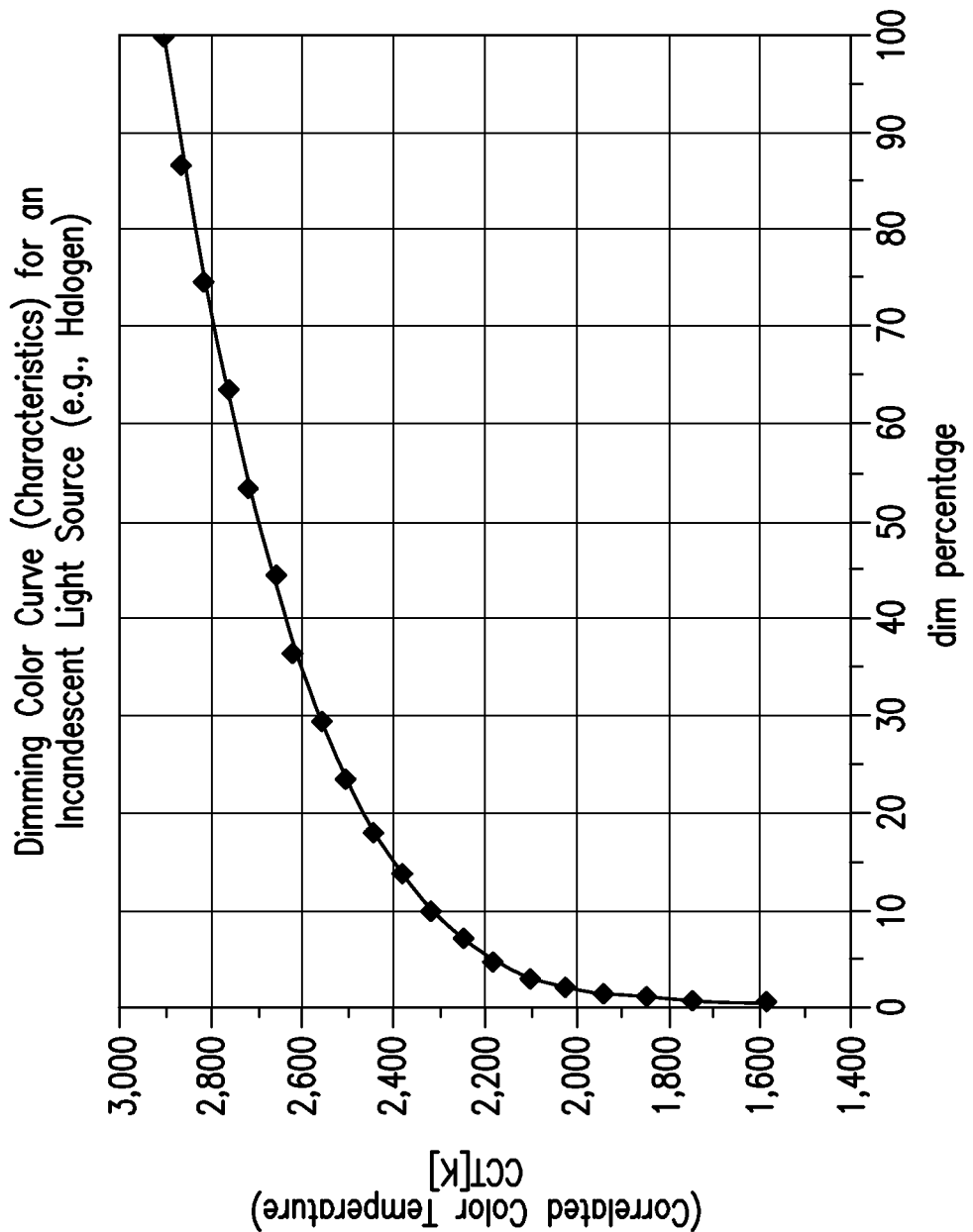
FIG. 1 illustrates an example dimming color curve for an incandescent light source, such as a halogen light source, with the correlated color temperature (CCT) in Kelvin shown in comparison to the dim percentage.

The present disclosure provides a flexible approach to designing and implementing dimmable LED lighting systems with customized color dimming curves that model, for example, those of an incandescent light source, or in other words, with incandescent style dimming. A dimmable LED lighting system with incandescent style dimming can be designed with three or more different types of LED light sources, which are selected according to their spectral power distribution (SPD) curves and driven at predefined power ratios therebetween over a dimming region of the LED lighting system. Through the selection of different types of LED light sources according to their SPD curves, the dimmable LED lighting system can also be configured to achieve higher color rendering index (CRI) with proper color mixing throughout the dimming region.

Prior to discussing the exemplary embodiments of the dimmable LED lighting system and method in greater detail with reference to the figures, various terms as used herein are explained below.

Spectral Power Distribution (SPD) describes the spectral power per unit area per unit wavelength of an illumination (radiant existence) or more generally, the per-wavelength contribution to any radiometric quantity.

Correlated Color Temperature (CCT) is a specification of the color appearance of the light emitted by a light source (e.g., a lamp), relating to its color to the color of light from a reference source when heated to a particular temperature. The CCT may be measured in degrees Kelvin (K). The CCT rating for a light source is a general "warmth" or "coolness" measure of its appearance. However, opposite to the temperature scale, light sources with a CCT rating below 3200 K are usually considered "warm" sources, while those with a CCT above 4000 K are usually considered "cool" in appearance.

Duv or Delta uv is the shortest distance between the chromaticity point in 1960 uv space to the Planckian locus. It is described by a positive number if the chromaticity point is above the Planckian locus and by a negative number if it is below the Planckian locus.

Planckian Locus (also referred to as "Black Body Locus") is the path or locus that the color of an incandescent black body would take in a particular chromaticity space as the black body temperature changes.

Color Rendering Index (CRI) is a quantitative measure of the ability of a light source to reproduce the colors of various objects faithfully in comparison with ideal or natural light sources. The CRI system is administered by the International Commission of Illumination (CIE). The CIE selected fifteen test color samples to grade the color properties of a white light source. The first eight samples R1-R8 are relatively low saturated colors and are evenly distributed over the complete range of hues. The first eight samples are employed to calculate the general color rendering index Ra. The general color rendering index Ra is simply calculated as the average of the first eight color rendering index values R1 through R8. The sample R9 is a value for a saturated or deep Red, which is important for interior lighting applications.

Figure 2:
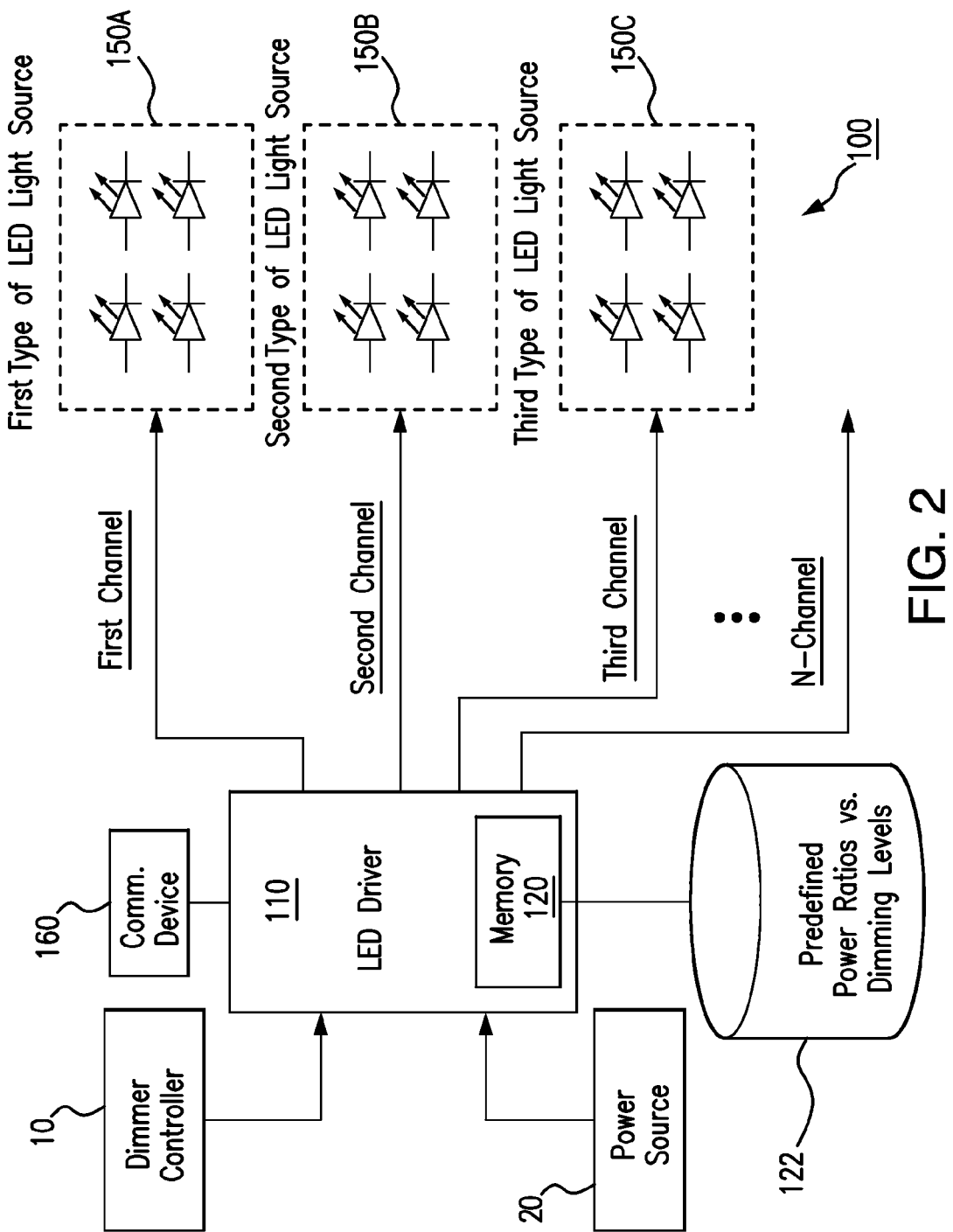
FIG. 2 illustrates a block diagram of example components of a dimmable LED lighting system with different types of LED light sources, which together provide for incandescent style dimming.

Turning to the figures, FIG. 2 illustrates an example of a dimmable LED lighting system 100, which can provide for incandescent style dimming. As shown in FIG. 2, the LED lighting system 100 includes an LED driver 110, at least three different types of LED light sources such as first, second and third types of LED light sources 150A, 150B and 150C respectively (collectively "150"), and a communication device 160. Each type of LED source 150 may include an array of LEDs. The first, second and third types of LED sources 150 are selected for their spectral power distribution (SPD) curves. In particular, the first, second and third types of LED light sources are selected so that their SPD curves together model a dimming color curve of an incandescent light source when the different types of LED light sources 150 are driven at predefined power ratios therebetween. For example, the dimming color curve of the LED lighting system 100 may be configured to fit the dimming color curve of an incandescent light source such as defined by the following equation:

$$CCT = a^* \mathrm{dim}^{(b+c/dim)} + d,$$

where CCT is a color correlated temperature,
dim is a dimming level such as a dim percentage,
$a = $ or $\approx 6.8959748723835673E^{-0.02}$,
$b = $ or $\approx 1.9098571934851816E^{-0.01}$,
$c = $ or $\approx 6.5991207217345549E^{-0.03}$, and
$d = $ or $\approx 1.2399634438633607E^{-0.03}$.

The dimming color curve of the LED lighting system 100 may instead be configured to fit the dimming color curve of an incandescent light source such as defined by the following equation:

$$CCT = 2920 + 396\ \ln(x) + 88.7\ \ln(x)^2 + 11.6\ \ln(x)^3$$

where CCT is a color correlated temperature, and
x is a dimming level such as a dim fraction.

The above-noted equations describe examples of a dimming color curve for an incandescent light source, such as a halogen light source, which can be modeled. The LED lighting system 100 may be configured to model other types of dimming color curves.

The LED driver 110 receives power from a power source 20, and may receive light settings such as a dimming level from a dimmer controller 10 or a remote device via the communication device 160. The dimming level may correspond to a dim percentage or dimming step over a dimming region. In operation, the LED driver 110 selectively drives current to each of the first, second and third types of LED light sources 150 via respective first, second and third channels. The current is selectively driven according to predefined power ratios according to the dimming level. The predefined power ratios may be stored locally in a memory 120 of the LED driver 110 or in an external memory accessible by the LED driver 110.

The communication device 160 provides for wireless or wireline communication with a remote device(s) (e.g., a tablet, smartphone, wireless remote controller, computer, server, etc.). The LED lighting system 100 may receive commands from the remote device. For example, as previously noted, the LED lighting system 100 may receive light settings, such as a dimming level, from the remote device via the communication device 160. The LED lighting system 100 may also download or receive data, such as the new or updated predefined power ratios from a remote device or system, via the communication device 160, for storage in an accessible memory (e.g., the memory 120).

Although the exemplary LED lighting system 100 is described with three different types of LED light sources having different SPD curves (characteristics), the system may include three or more different types of LED light sources. The LED driver 110 can be a programmable multi-channel LED driver, which drives each channel using constant current reduction (CCR), pulse width modulation (PWM), hybrid of CCR and PWM, or any combination thereof. The LED driver 110 may be operated as a stand-alone or under control of a controller (e.g., a processor) of the LED lighting system.

Various exemplary embodiments of an LED lighting system with incandescent style dimming are described below along with their spectral properties. In the first embodiment, the LED lighting system is configured with a general CRI of Ra that is greater than 80. In the second embodiment, the LED lighting system has a general CRI of Ra that is greater than 90, where one of the types of LED light sources on one channel has an Ra greater than or equal to 90 and the other types of LED light sources on the other channels have an Ra less than 90 (e.g., 80<Ra<90).

First Embodiment

In the first embodiment, the dimmable LED lighting system includes first, second and third types of LED light sources with selected SPD curves on first, second and third channels, respectively, to provide for incandescent style dimming. The LED lighting system has the following spectral properties on the first, second and third channels:

$20 \leq \alpha_1 \leq 35$, $35 \leq \beta_1 \leq 58$, and $1.63 \leq \gamma_1 \leq 1.79$ on the first channel, $12.8 \leq \alpha_2 \leq 17.85$, $46 \leq \beta_2 \leq 66$, and $3.6 \leq \gamma_2 \leq 3.8$ on the second channel, and $7.7 \leq \alpha_3 \leq 13.7$, $80 \leq \beta_3 \leq 155$, and $10.2 \leq \gamma_3 \leq 11.6$ on the third channel, where $S(\lambda)$ is a function of the SPD curve which reflects spectral power versus a wavelength of an LED light source, $I_1$ is $\{Max[S(\lambda)]\}$ in a wavelength range of 400 to 500 nm,
$I_2$ is $\{Min[S(\lambda)]\}$ in a wavelength range of 420 to 550 nm,
$I_3$ is $\{Max[S(\lambda)]\}$ in a wavelength range of 500 to 700 nm,
$\alpha_1 = I_1/I_2$, $\beta_1 = I_3/I_2$ and $\gamma_1 = I_3/I_1$ on the first channel,
$\alpha_2 = I_1/I_2$, $\beta_2 = I_3/I_2$ and $\gamma_2 = I_3/I_1$ on the second channel, and
$\alpha_3 = I_1/I_2$, $\beta_3 = I_3/I_2$ and $\gamma_3 = I_3/I_1$ on the third channel.

In this embodiment, the LED lighting system may have the following relationship between the channels.

$\alpha_1 : \alpha_2 : \alpha_3 =$ (from 2.3 to 3.8):(from 1.2 to 2.1):1,
$\beta_1 : \beta_2 : \beta_3 =$ (from 0.35 to 0.52):(from 0.41 to 0.72):1, and
$\gamma_1 : \gamma_2 : \gamma_3 =$ (from 0.13 to 0.17):(from 0.31 to 0.36):1.

Figure 3A:
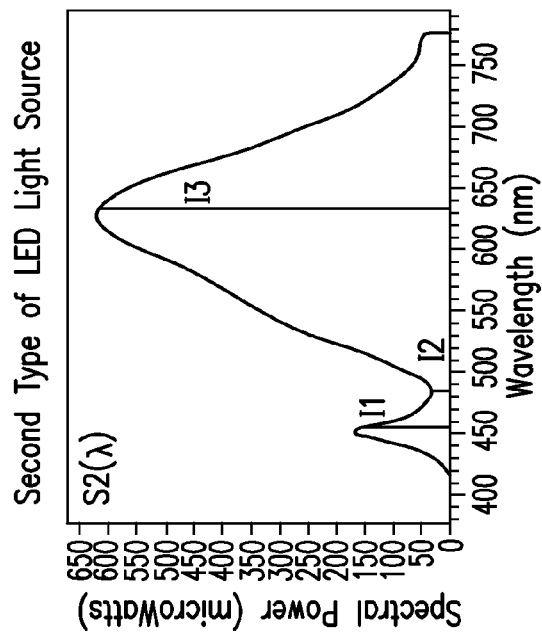
FIGS. 3A, 3B and 3C illustrate example spectral power distribution (SPD) curves of spectral power (microwatts) versus wavelength (nanometers or nm) for a first, second and third types of LED respectively, each of which are selected for use in an LED lighting system to provide for incandescent style dimming in accordance with a first embodiment.
Figure 3B:
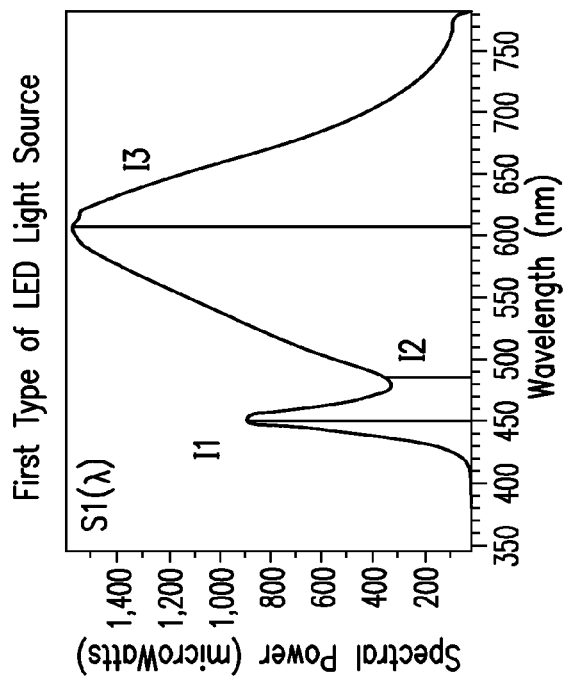
Figure 3C:
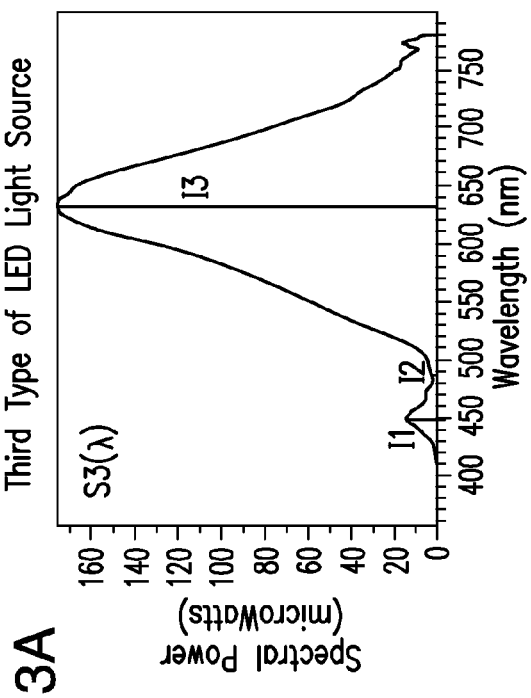

Examples of three SPD curves $S_1(\lambda)$, $S_2(\lambda)$ and $S_3(\lambda)$ of the first, second and third types of LED light sources on respective first, second and third channels are shown in FIGS. 3A, 3B and 3C, respectively. In FIGS. 3A-3C, the graphs of the SPD curves are expressed as spectral power (microwatts) versus wavelength (nm). The minimum or maximum intensity of the spectral power $I_1$, $I_2$ and $I_3$ are identified on each of the SPD curves of FIGS. 3A, 3B and 3C, and are used to derive α, β, and γ on each channel (as indicated above). The LED lighting system may be configured with the following specific values for α, β, and γ on each channel:

$\alpha_1 = 25$, $\beta_1 = 42$, or $\gamma_1 = 1.73$ on the first channel,
$\alpha_2 = 15$, $\beta_2 = 55$, or $\gamma_2 = 3.65$ on the second channel, or
$\alpha_3 = 9.5$, $\beta_3 = 103$, or $\gamma_3 = 10.8$ on the third channel.

Figure 4:
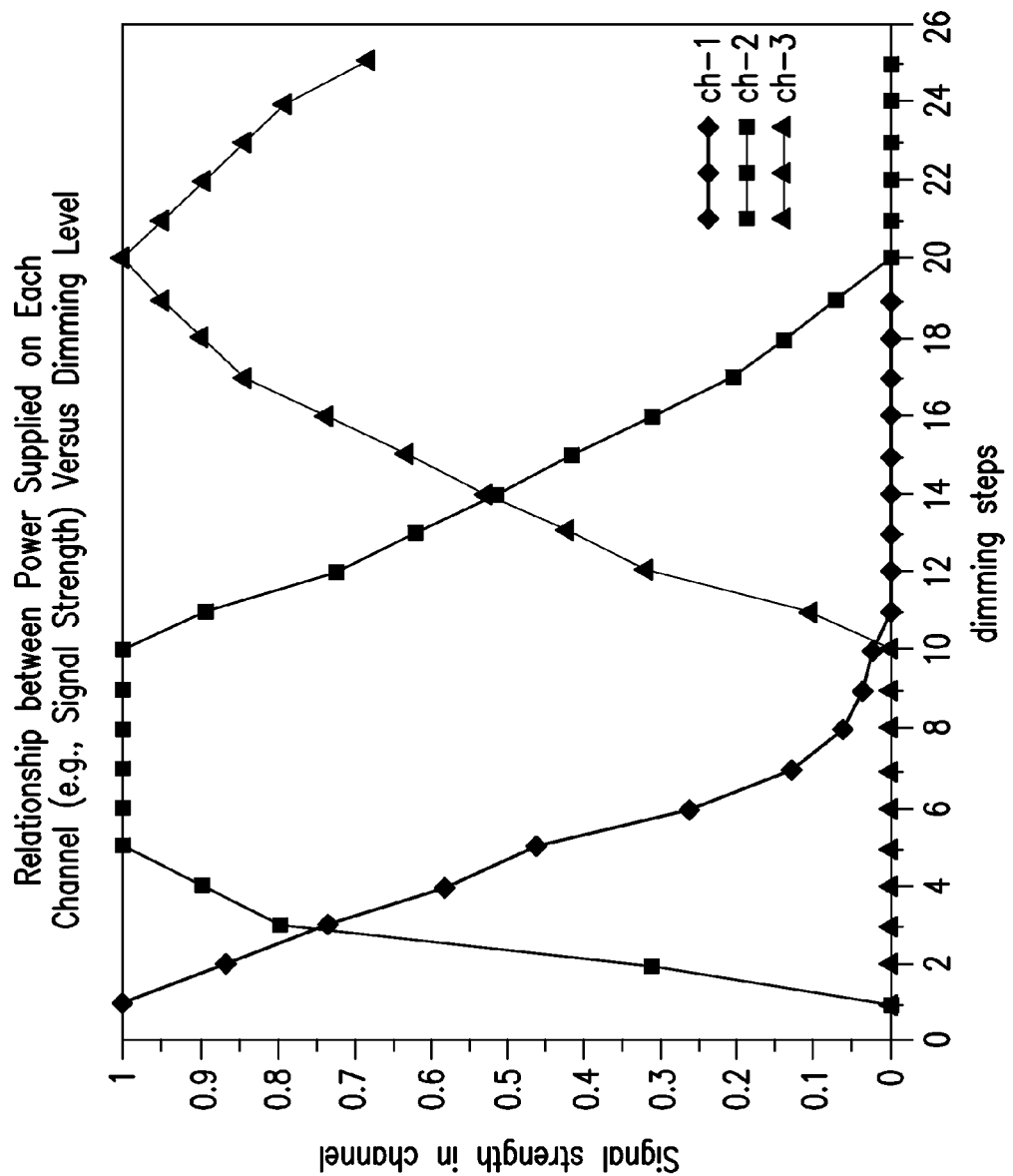
FIG. 4 illustrates three graphs showing the relationship between power supplied on each channel for the first, second and third types of LED versus the dimming level (e.g., dimming steps).
Figure 5:
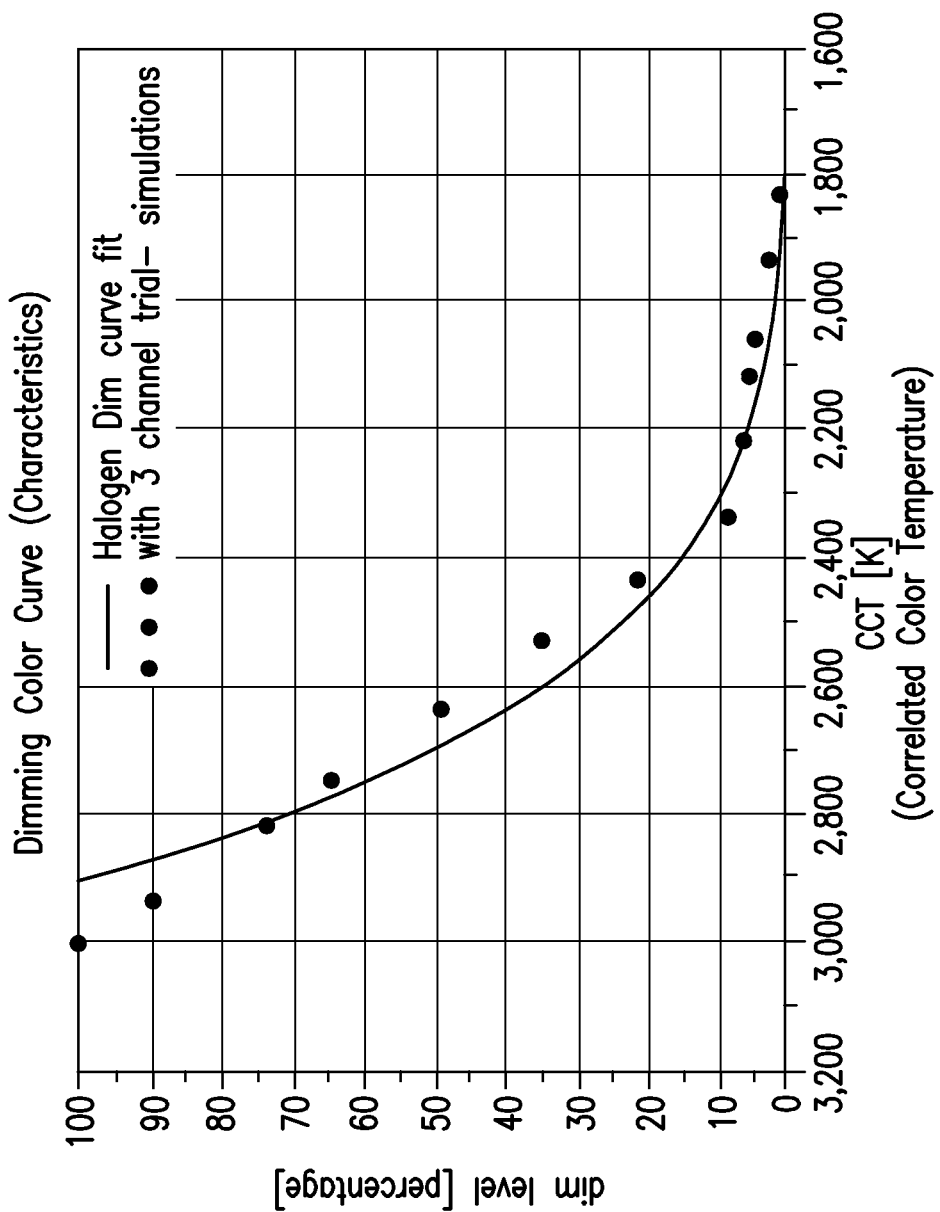
FIG. 5 illustrates a dimming color curve in which the dim level (e.g., dimming percentage) is compared to the correlated color temperature (CCT) in Kelvin based on simulations of the LED lighting system with SPD curves, such as shown in FIGS. 3A, 3B and 3C.

For the SPD curves shown in FIGS. 3A-3C, the LED lighting system is configured to drive current on each channel according to the predefined power ratios (e.g., ratio of signal strength) therebetween such as shown on the left side in Table A of FIG. 3D for a dimming region. The relationship between the power supplied on the first, second and third channels versus the dimming level (e.g., dimming steps) is shown as a graph in FIG. 4. FIG. 5 illustrates dimming color curves (e.g., dimming level in dim percentages versus color correlated temperature (CCT) in Kelvin) for the LED lighting system and an incandescent light source (e.g., a halogen light). As shown in FIG. 5, the dimming color curve of the LED lighting system in this example is modeled to substantially fit the color dimming curve for an example incandescent light source.

Figure 6:
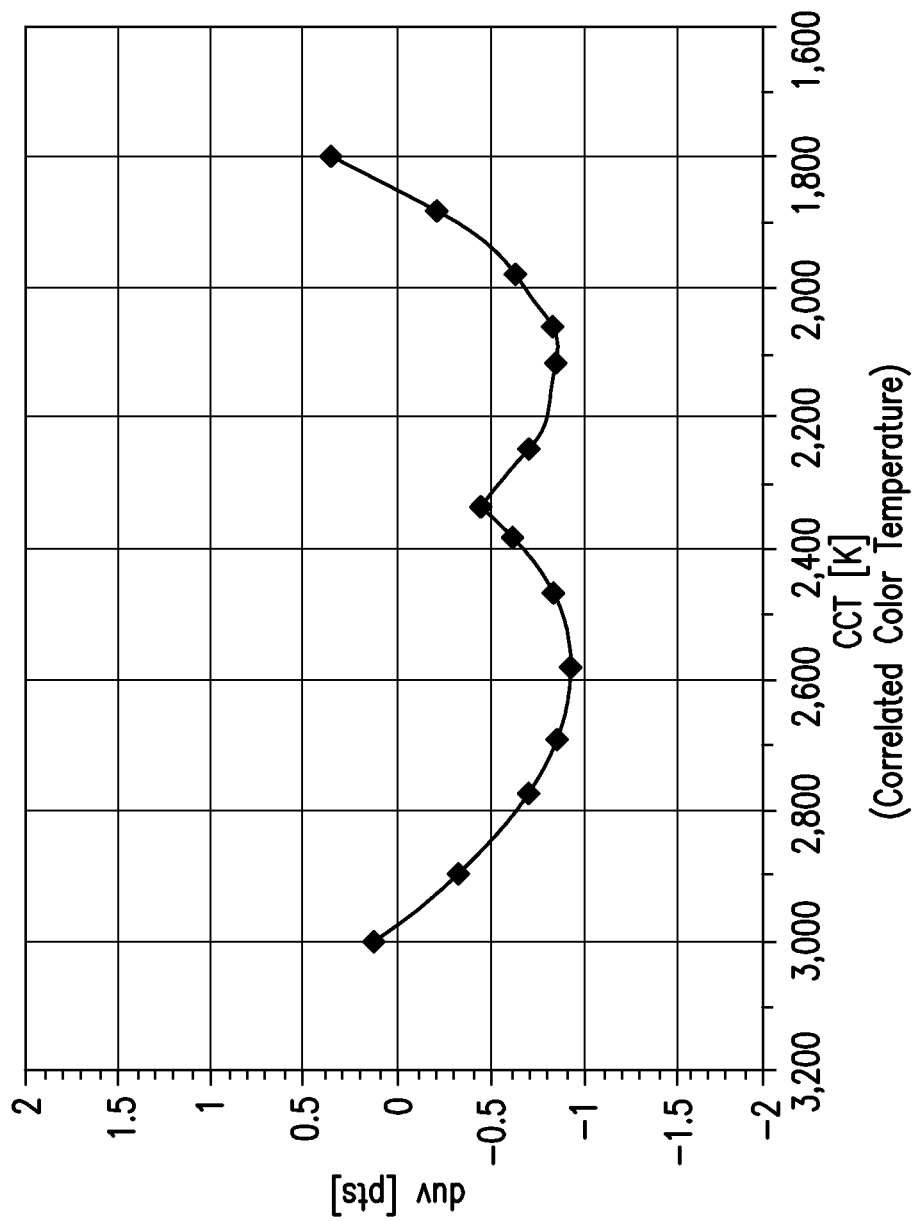
FIG. 6 illustrates a graph of duv versus correlated color temperature (CCT) in Kelvin based on simulations of the LED lighting system with SPD curves, such as shown in FIGS. 3A, 3B and 3C.
Figure 7:
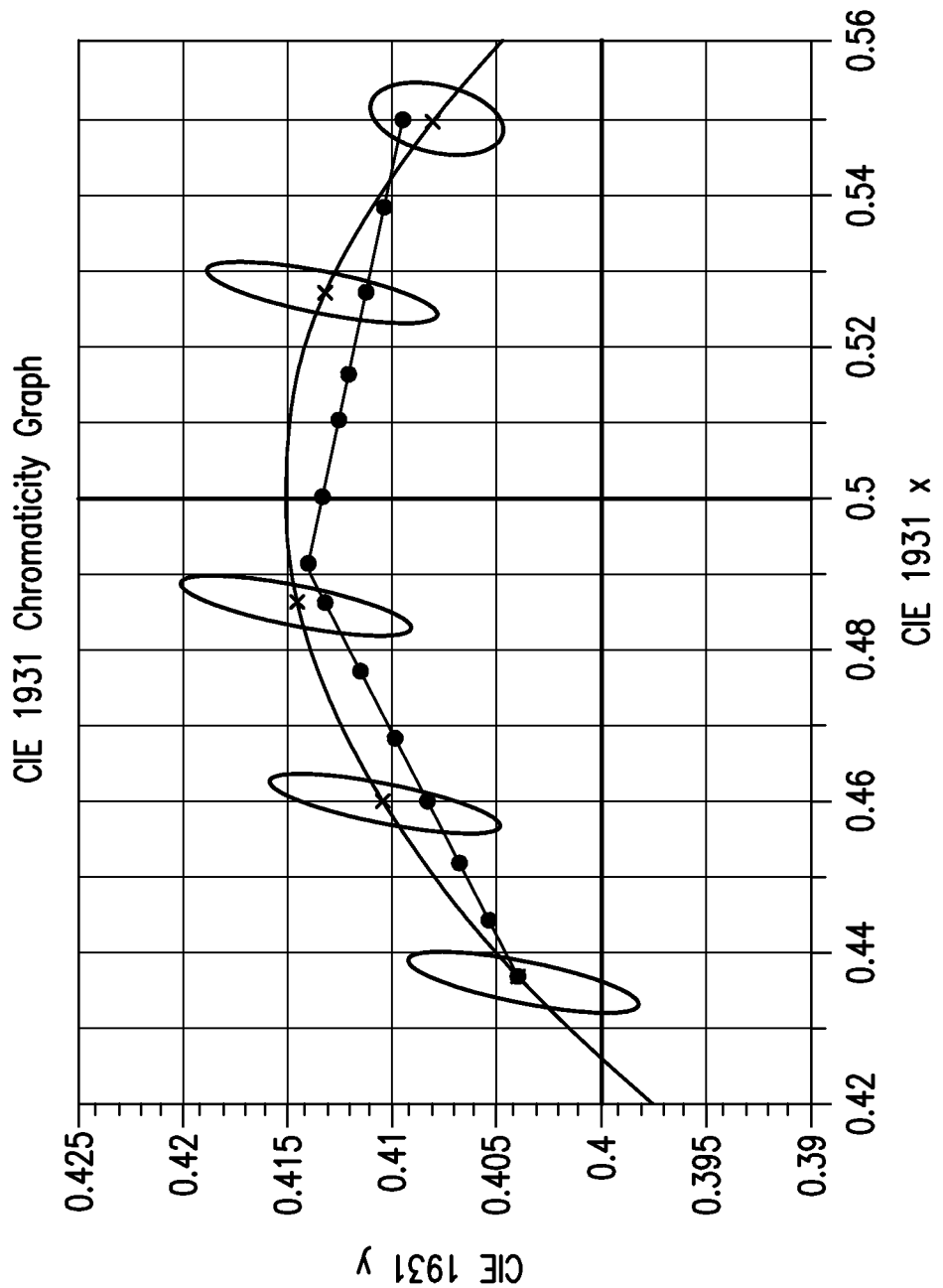
FIG. 7 illustrates an example of CIE 1931 chromaticity graph based on simulations of the LED lighting system with SPD curves, such as shown in FIGS. 3A, 3B and 3C.
Figure 8:
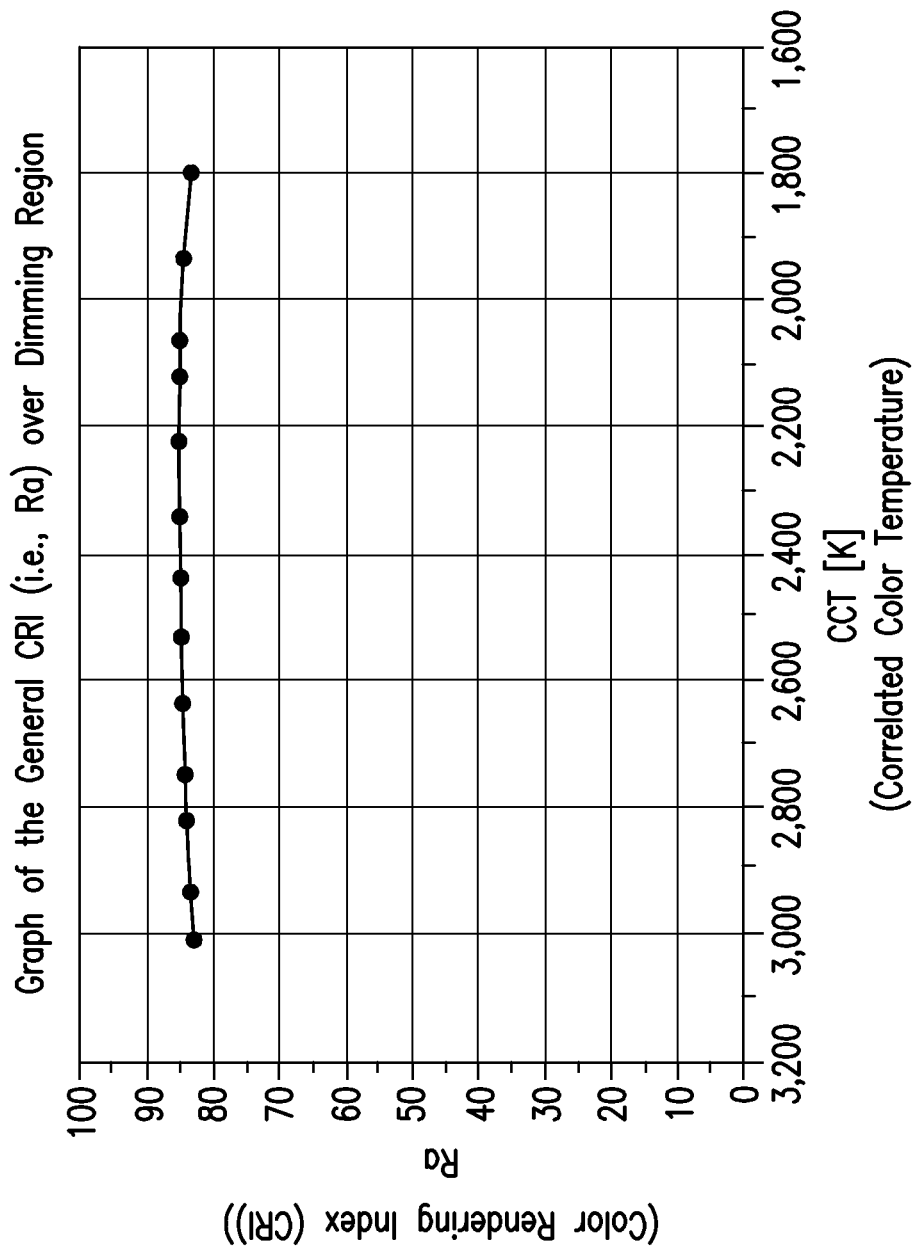
FIG. 8 illustrates a graph of general color rendering index (CRI), i.e., Ra, versus the correlated color temperature (CCT) based on simulations of the LED lighting system with SPD curves, such as shown in FIGS. 3A, 3B and 3C.

Table A of FIG. 3D also shows the measurement results of various spectral characteristics of the LED lighting system at various predefined power ratios in the dimming region. As shown in Table A of FIG. 3D, the predefined power ratios between the channels are listed in order of dimming levels, as reflected by the decreasing CCT and normalized flux shown on the right side of the table. The spectral characteristics described on Table A are based on simulations of the LED lighting system, and also include x and y values on CIE 1931 chromaticity graph, CCT, duv, Ra and R9. These spectral characteristics are better shown in FIGS. 6, 7 and 8 for the LED lighting system with SPD curves of FIGS. 3A, 3B and 3C. For example, FIG. 6 is a graph of duv versus correlated color temperature (CCT) in Kelvin of the LED lighting system. FIG. 7 is a CIE 1931 chromaticity graph with x and y parameter of the LED lighting system. FIG. 8 is a graph of CRI versus CCT, which shows that Ra is greater than 80 over a dimming region for the LED lighting system.

Figure 9:
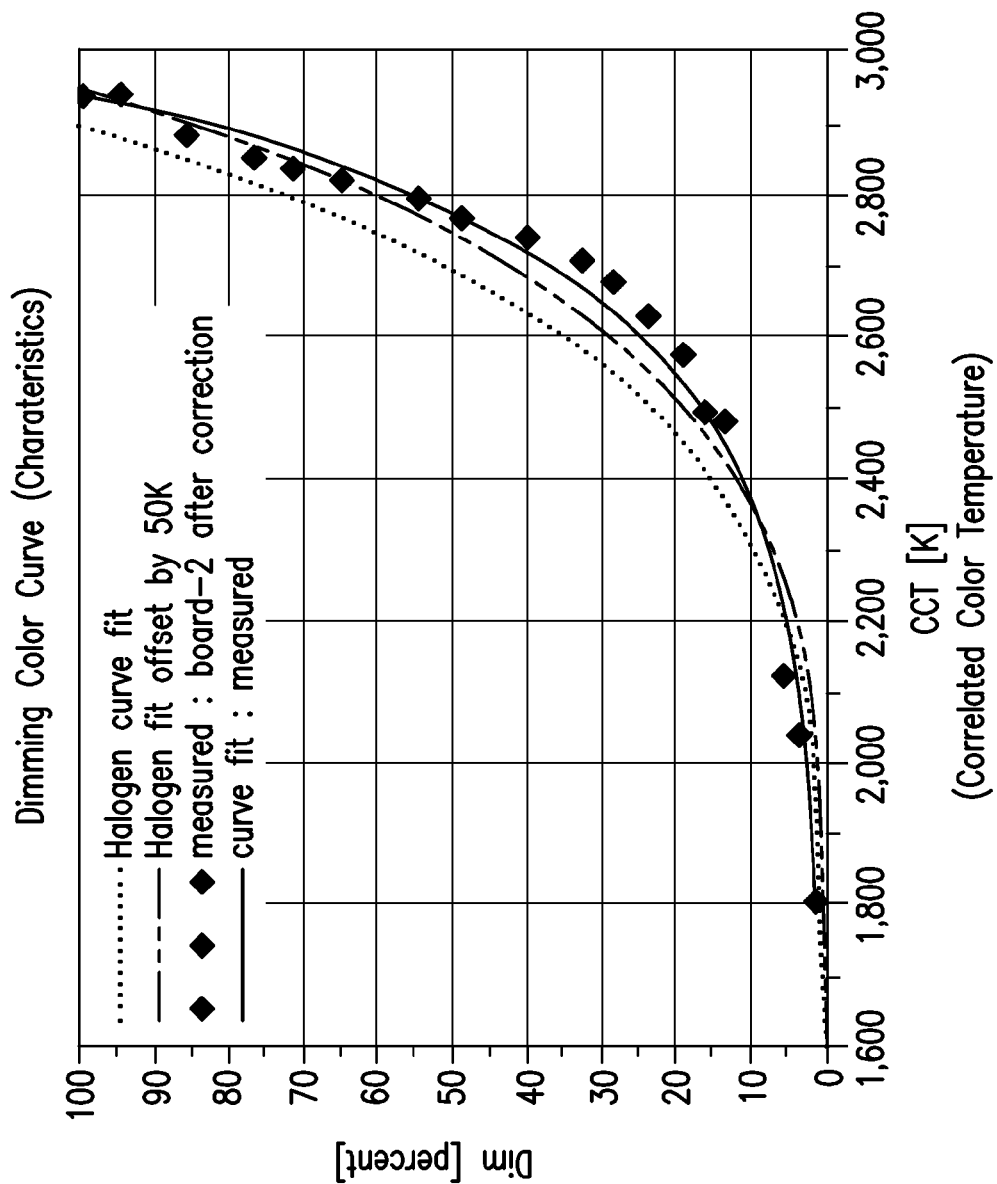
FIG. 9 illustrates another example of dimming color curves in which the dim level (e.g., dimming percentage) is compared to the correlated color temperature (CCT) based on other simulations of a LED lighting system with selected SPD curves in accordance with a first embodiment.
Figure 10:
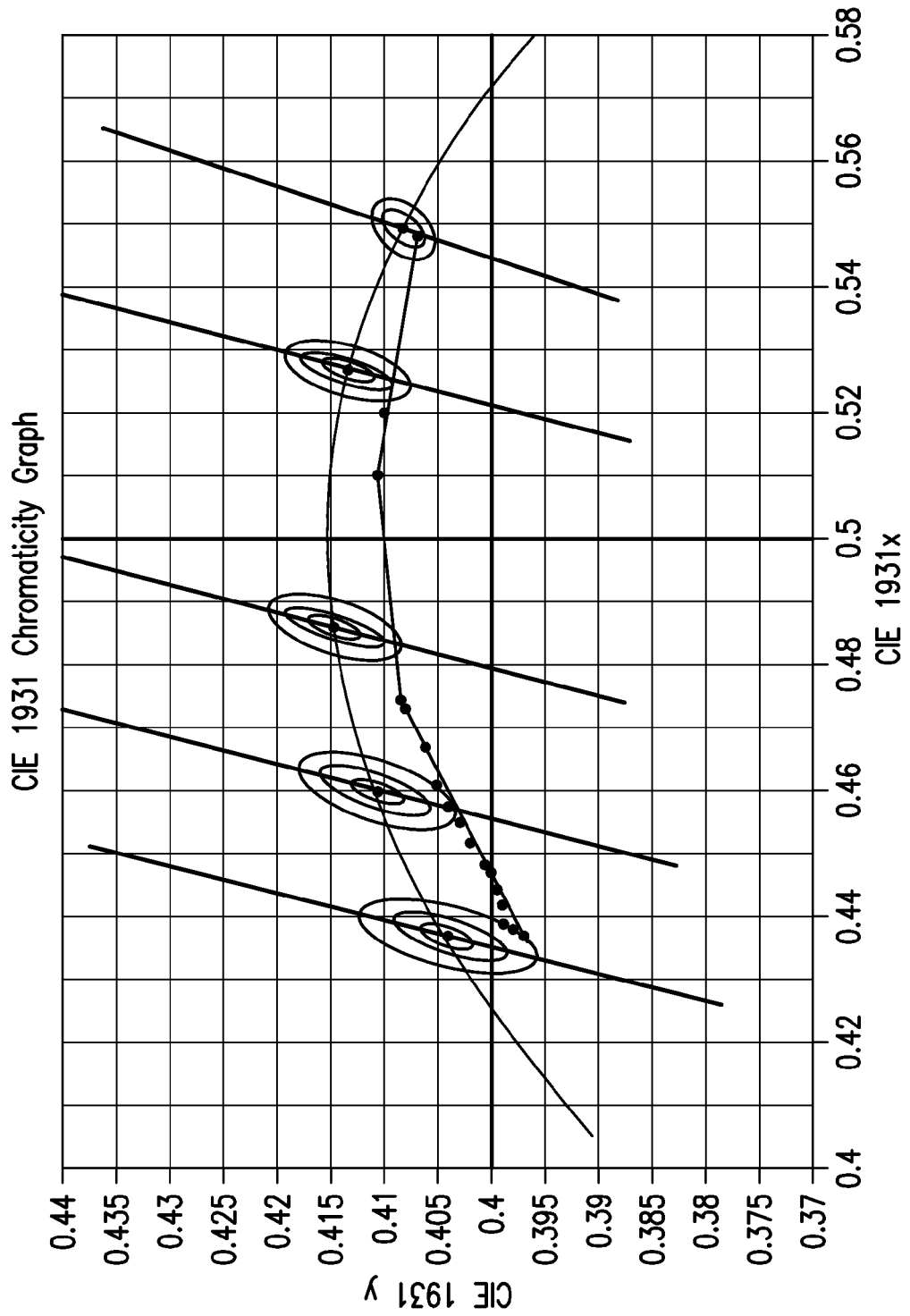
FIG. 10 illustrates another example of an CIE 1931 chromaticity graph based on other simulations of the LED lighting system with selected SPD curves in accordance with a first embodiment.

FIG. 9 illustrates graphs of another example of dimming color curves (e.g., dimming level in dim percentages versus color correlated temperature (CCT) in Kelvin) for the LED lighting system and an incandescent light source (e.g., a halogen light). As shown in FIG. 9, the color dimming curve of the LED lighting system (e.g., measured after correction or curve fit) is substantially the same as the color dimming curves (e.g., Halogen curve fit and Halogen fit offset by 50K) for an example incandescent light source. FIG. 10 is another example of CIE 1931 chromaticity graph with x and y parameter of the LED lighting system.

Second Embodiment

In the second embodiment, the dimmable LED lighting system also includes three different types of LED light sources with selected SPD curves to provide for incandescent style dimming. The LED lighting system includes first, second and third types of LED light sources on first, second and third channels, respectively. In this example, the LED lighting system has the following spectral properties on the first, second and third channels:

$20 \leq \alpha_1 \leq 35$, $35 \leq \beta_1 \leq 58$, and $1.63 \leq \gamma_1 \leq 1.79$ on the first channel, $7.7 \leq \alpha_2 \leq 13.7$, $80 \leq \beta_2 \leq 155$, and $10.2 \leq \gamma_2 \leq 11.6$ on the second channel, and the third type of LED light source is one of an amber (e.g., a phosphor converted (PC)-amber), red-orange or red LED light source on the third channel, where $I_1$ is {Max[S(λ)]} in a wavelength range of 400 to 500 nm,
$I_2$ is {Min[S(λ)]} in a wavelength range of 420 to 550 nm,
$I_3$ is {Max[S(λ)]} in a wavelength range of 500 to 700 nm,
$\alpha_1 = I_1/I_2$, $\beta_1 = I_3/I_2$ and $\gamma_1 = I_3/I_1$ on the first channel,
$\alpha_2 = I_1/I_2$, $\beta_2 = I_3/I_2$ and $\gamma_2 = I_3/I_1$ on the second channel, and
$\alpha_3 = I_1/I_2$, $\beta_3 = I_3/I_2$ and $\gamma_3 = I_3/I_1$ on the third channel.

In this example, the first type of LED light source on the first channel may have an Ra greater than 80, and the second type of LED light source on the second channel may have an Ra greater than 90. The LED lighting system may have the following specific values for α, β, and γ on the first and second channels:

$\alpha_1 = 25$, $\beta_1 = 42$, or $\gamma_1 = 1.73$ on the first channel, or
$\alpha_2 = 9.5$, $\beta_2 = 103$, or $\gamma_2 = 10.8$ on the second channel.

The LED lighting system is configured to drive current on each channel according to the predefined power ratios (e.g., ratios of signal strength) therebetween such as shown on the left side in Table B of FIG. 11 over a dimming region.

Table B of FIG. 11 shows the measurement results of spectral characteristics of the LED lighting system at various predefined power ratios in the dimming region. As shown in Table B, the predefined power ratios are listed in order of dimming levels, as reflected by the decreasing CCT in Kelvin as shown on the middle of the table. The spectral characteristics described on Table B are based on simulations of the LED lighting system, and also include values for duv, Ra and R9.

In the second embodiment, the LED lighting system has a general CRI of Ra greater than 90 throughout the dimming region, where one of the three types of LED light sources has an Ra greater than 90 and the other two of the three types of LED light sources have an Ra less than 90 (e.g., 80<Ra<90). Furthermore, the LED lighting system has a value of R9 greater than 50 throughout the dimming region, where none of the three different types of LED light sources have a R9 greater than 50.

Figure 12:
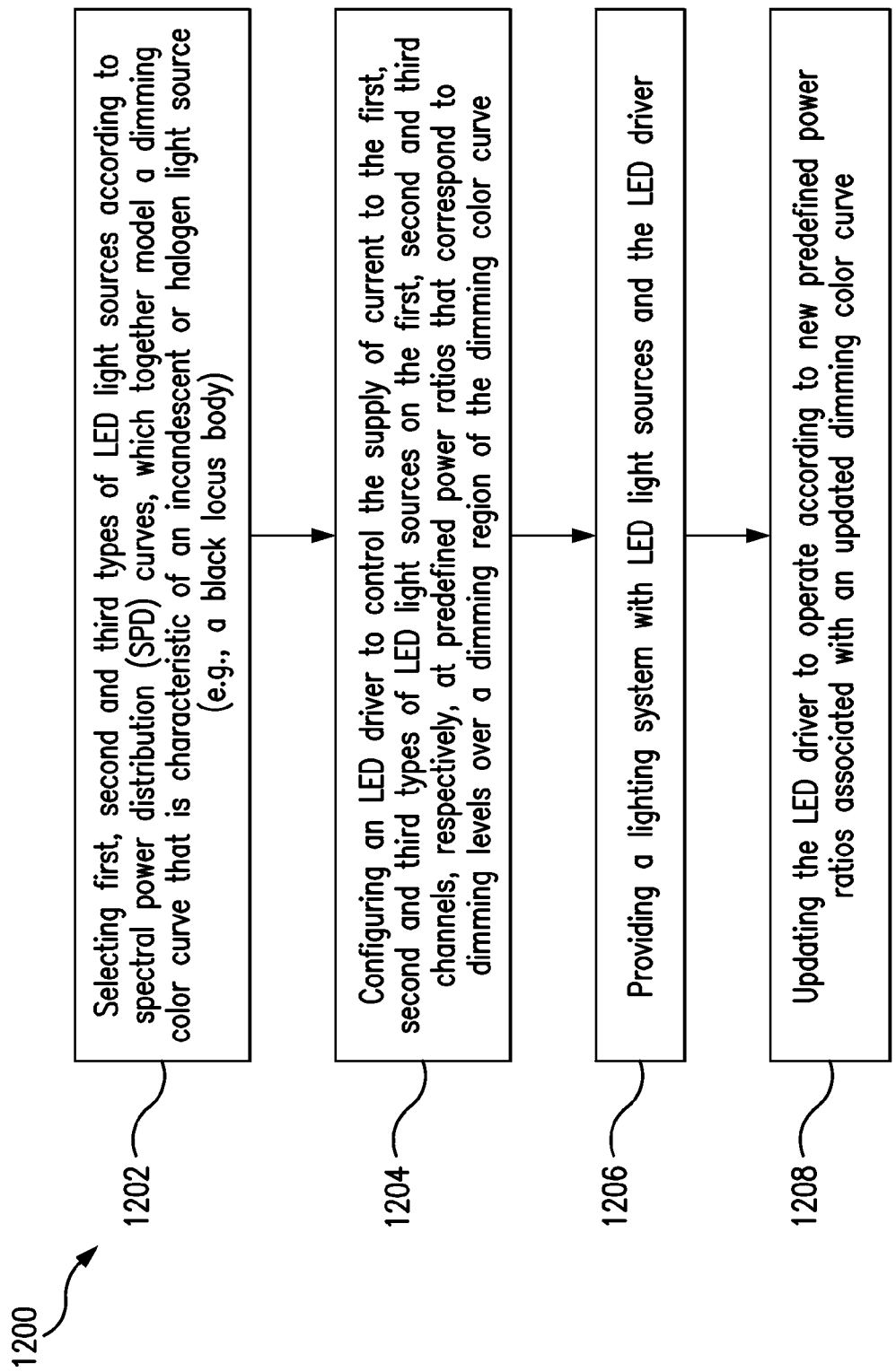
FIG. 12 illustrates a process of manufacturing an LED lighting system with incandescent style dimming.

FIG. 12 illustrates a process 1200 of manufacturing a dimmable LED lighting system with incandescent style dimming, such as described herein. At reference 1202, first, second and third types of LED light sources are selected based on their spectral power distribution (SPD) curves. The SPD curves are selected so that the combination of the different types of LED light sources together model a dimming color curve that is characteristic of an incandescent light source (e.g., a black locus body) when operated at predefined power ratios therebetween over a dimming region. The different types of LED light sources may be selected according to their maximum (e.g., peak) and minimum (e.g., valley) profiles of intensity of the spectral power (e.g., $I_1$, $I_2$ and $I_3$ for a three channel system) as reflected in their SPD curves.

At reference 1204, a LED driver is configured to control the supply of current to the first, second and third types of LED light sources on first, second and third channels respectively at predefined power ratios that correspond to dimming levels over a dimming region of the dimming color curve.

At reference 1206, the LED lighting system is provided with the different types of LED light sources and the LED driver.

At reference 1208, the LED driver may be updated to operate according to new predefined power ratios associated with an updated dimming color curve.

The LED driver and LED lights sources may be assembled before or after configuring the LED driver to operate according to a set of predefined power ratios.

Figure 13:
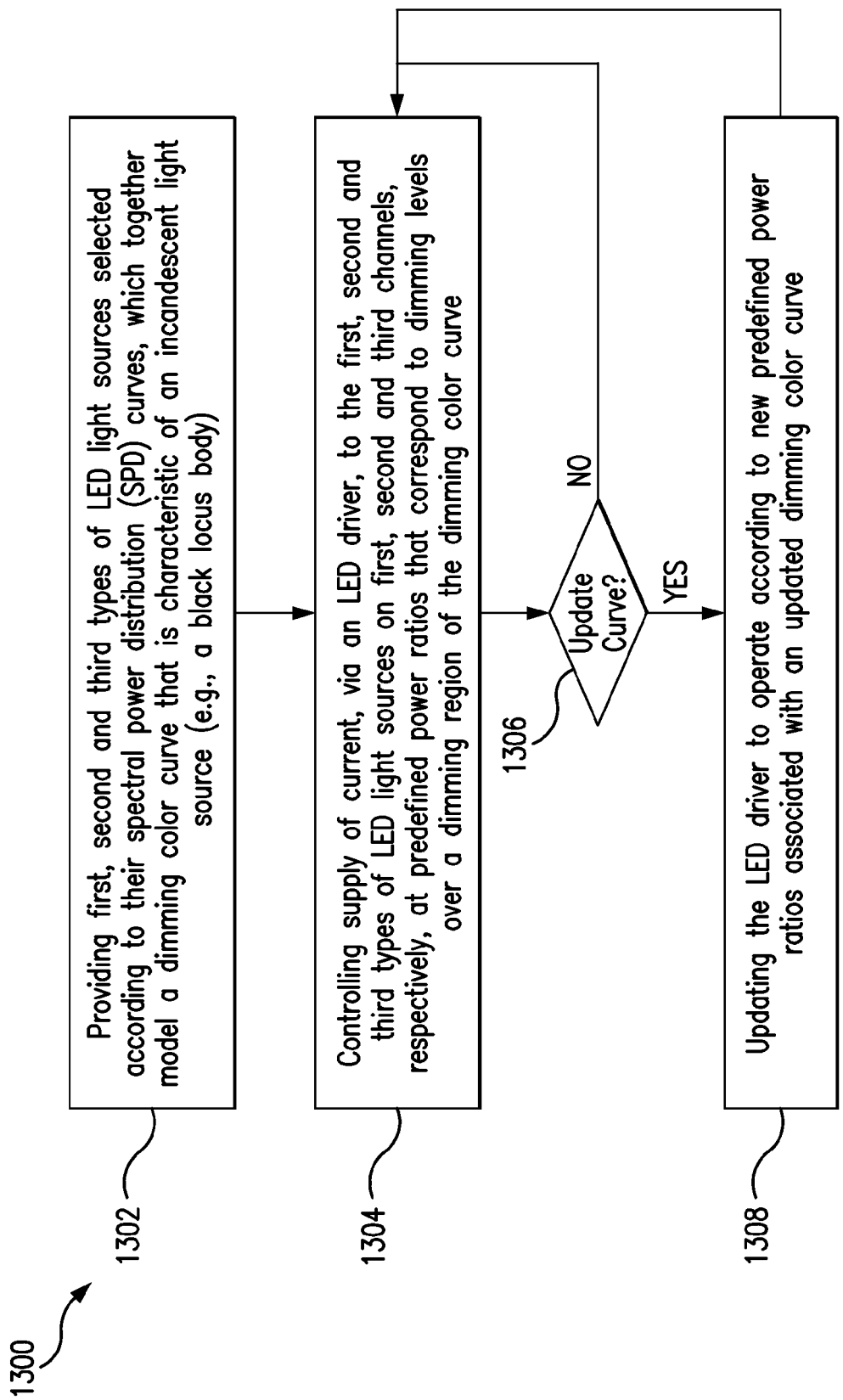
FIG. 13 illustrates a process of operating an LED lighting system with incandescent style dimming.

FIG. 13 illustrates a process 1300 of operating an LED lighting system with incandescent style dimming. At reference 1300, first, second and third types of LED light sources are provided for a LED lighting system. The different types of LED light sources are selected for their spectral power distribution (SPD) curves. The SPD curves are selected so that the combination of the different types of LED light sources together model a dimming color curve that is characteristic of an incandescent light source when operated at predefined power ratios therebetween over a dimming region.

At reference 1304, a LED driver is provided which selectively controls current to the first, second and third types of LED light sources on first, second and third channels respectively at predefined power ratios. The predefined power ratios correspond to dimming levels over a dimming region of the dimming color curve, and may be stored in memory.

At reference 1306, a determination is made whether to update the dimming color curve of the LED lighting system. If not, the LED lighting system operates according to the predefined power ratios stored in memory. Otherwise, at reference 1308, the LED driver is updated to operate according to new or updated predefined power ratios associated with an updated dimming color curve. The LED lighting system can receive data for the new or updated predefined power ratios from a remote device via a communication device, and store the data in the memory.

The LED lighting systems described above in the present disclosure are provided as examples. The dimmable LED lighting system have been described as being modeled to provide for incandescent style dimming; however, the LED lighting system and method may provide for any style of dimming with adjustable color temperature by utilizing predetermined ratios of peaks and valleys (e.g., $I_1$, $I_2$ and $I_3$) in the selected SPDs of the different types of LED light sources on each channel. The LED lighting system may include any number of different types of LED light sources and channels. For example, for a n-channel LED lighting system, $\alpha_n = I_1/I_2$, $\beta_n = I_3/I_2$ and $\gamma_n = I_3/I_1$ on the n-th channel.

Furthermore, the LED lighting system may include light sources in which the LEDs may or may not be coated with phosphor material(s) depending on the desired spectral properties. For example, the LED can have an emitting peak wavelength in the region between 380 and 500 nm, such as a typical blue, ultra-violet (UV) or near UV LED. The substrate material for the LED can be GaN, Sapphire, Silica or other suitable material.

If phosphor is not deposited on the LED, it can have any peak or dominant wavelength in the region of 380-500 nm. If any phosphor material has already been deposited on the LED as in cool white LEDs, the CCT may be changed by placing another phosphor layer over the LED. This other phosphor layer can be considered a remote phosphor layer on top of the cool white LED. The phosphor layer can be located directly over the cool white (or blue LED) or can be remotely positioned anywhere in the mixing chamber in proximity to the LED.

A phosphor layer can be formed from phosphors, such as selected from YAG, LuAG, Nitride, Oxy-Nitrides, Oxides, Sulphides, Silicates or other suitable phosphors for LED lighting applications. The phosphor layer can be coated with either one or more of the listed phosphors, or a combination thereof. The phosphors can be either directly deposited on the LED substrate, deposited on a lens or translucent rubber sheet, or screen printed on a silicone layer with a combination of phosphors. The matrix is defined as the medium in which the phosphor(s) are placed, and can be either one or a combination of those described above. Phosphors can be positioned either on the chip or anywhere in the light mixing chamber. If phosphor is positioned such as a remote phosphor, the predefined mixture for the specific channel of the LED lighting system is not necessarily limited to only one combination.

In addition, words of degree, such as "about", "substantially", and the like are used herein in the sense of "at, or nearly at, when given the manufacturing, design, and material tolerances inherent in the stated circumstances" and are used to prevent the unscrupulous infringer from unfairly taking advantage of the invention disclosure where exact or absolute figures and operational or structural relationships are stated as an aid to understanding the invention.

Although specific example embodiments of the invention have been disclosed, persons of skill in the art will appreciate that changes may be made to the details described for the specific example embodiments.

The invention claimed is:

1. A dimmable LED lighting system comprising:
a first LED light source;
a second LED light source;
a third LED light source, wherein:
the first LED light source, the second LED light source, and third LED light source are selected with different spectral power distribution (SPD) curves;
the first, second, and third LED light sources have the following properties:
$1.63 \leq \gamma_1 \leq 1.79$ for the first LED light source,
$3.6 \leq \gamma_2 \leq 3.8$ for the second LED light source, and
$10.2 \leq \gamma_3 \leq 11.6$ for the third LED light source,
where $S(\lambda)$ is a function of spectral power versus a wavelength of an LED light source,
I1 is $\{Max[S(\lambda)]\}$ in a wavelength range of 400 to 500 nm,
I2 is $\{Min[S(\lambda)]\}$ in a wavelength range of 420 to 550 nm,
I3 is $\{Max[S(\lambda)]\}$ in a wavelength range of 500 to 700 nm,
$\gamma_1 = I_3/I_1$ for the first LED light source,
$\gamma_2 = I_3/I_1$ for the second LED light source, and
$\gamma_3 = I_3/I_1$ for the third LED light source; and
the selected SPD curves together modeling a dimming color curve that is characteristic of an incandescent light source when the first LED light source, the second LED light source, and the third LED light source are driven on a first channel, a second channel, and a third channel, respectively, at predefined power ratios that correspond to dimming levels over a dimming region of the dimming color curve; and
an LED driver to control current supply on the first channel, the second channel, and the third channel to the first LED light source, the second LED light source, and the third LED light sources, respectively, at a power ratio from the predefined power ratios according to a selected dimming level, wherein a color rendering index is 90 or greater over the dimming region of the dimming color curve for a combination of the first LED light source, the second LED light source, and the third LED light source.

2. The dimmable LED lighting system of claim 1, wherein the dimming color curve is defined by the following equation:

$$CCT = 2920 + 396 \ln(x) + 88.7 \ln(x)^2 + 11.6 \ln(x)^3$$

where CCT is a color correlated temperature, and
x is a dim percentage.

3. The dimmable LED lighting system of claim 1, wherein the first, second, and third LED light sources and their associated first, second, and third channels have the following properties:
$20 \leq \alpha_1 \leq 35$ and $35 \leq \beta_1 \leq 58$ for the first LED light source on the first channel,
$12.8 \leq \alpha_2 \geq 17.85$ and $46 \leq \beta_2 \leq 66$ for the second LED light source on the second channel, and
$7.7 \leq \alpha_3 \leq 13.7$ and $80 \leq \beta_3 \leq 155$ for the third LED light source on the third channel,
where
$\alpha_1 = I_1/I_2$ and $\beta_1 = I_3/I_2$ for the first LED light source on the first channel,
$\alpha_2 = I_1/I_2$ and $\beta_2 = I_3/I_2$ for the second LED light source on the second channel, and
$\alpha_3 = I_1/I_2$ and $\beta_3 = I_3/I_2$ for the third LED light source on the third channel.

4. The dimmable LED lighting system of claim 3, wherein
(1) $\alpha_1 = 25$, $\beta_1 = 42$, or $\gamma_1 = 1.73$,
(2) $\alpha_2 = 15$, $\beta_2 = 55$, or $\gamma_2 = 3.65$, or
(3) $\alpha_3 = 9.5$, $\beta_3 = 103$, or $\gamma_3 = 10.8$.

5. The dimmable LED lighting system of claim 1, wherein the first, second, and third LED light sources and their associated first, second, and third channels have the following properties:
$\alpha_1:\alpha_2:\alpha_3 = $(from 2.3 to 3.8):(from 1.2 to 2.1):1,
$\beta_1:\beta_2:\beta_3 = $(from 0.35 to 0.52):(from 0.41 to 0.72):1, and
$\gamma_1:\gamma_2:\gamma_3 = $(from 0.13 to 0.17):(from 0.31 to 0.36):1,
where
$\alpha_1 = I_1/I_2$ and $\beta_1 = I_3/I_2$ for the first LED light source,
$\alpha_2 = I_1/I_2$ and $\beta_2 = I_3/I_2$ for the second LED light source, and
$\alpha_3 = I_1/I_2$ and $\beta_3 = I_3/I_2$ and for the third LED light source.

6. The dimmable LED lighting system of claim 1, wherein the first LED light source, the second LED light source, and the third LED light source and their associated first, second, and third channels have the following properties:
$20 \leq \alpha_1 \leq 35$ and $35 \leq \beta_1 \leq 58$ for the first LED light source,
$7.7 \leq \alpha_2 \leq 13.7$, $80 < \beta_2 \leq 155$, and $10.2 \leq \gamma_2 \leq 11.6$ for the second LED light source,
where
$\alpha_1 = I_1/I_2$ and $\beta_1 = I_3/I_2$ for the first LED light source, and
$\alpha_2 = I_1/I_2$ and $\beta_2 = I_3/I_2$ for the second LED light source.

7. The dimmable LED lighting system of claim 1, wherein a color rendering index Ra is greater than 90 over the dimming region of the dimming color curve for the combination of the first LED light source, the second LED light source, and the third LED light source with one of the first LED light source, the second LED light source, and the third LED light source on one channel having an Ra greater than 90 and the other two of the first, second, and third LED light sources on the other channels having an Ra equal to or less than 90.

8. The dimmable LED lighting system of claim 1, wherein:
the first LED light source has a first color temperature of between 2900 Kelvin and 3100 Kelvin,
the second LED light source has a second color temperature between 2200 Kelvin and 2400 Kelvin, and
the third LED light source has a third color temperature between 1750 Kelvin and 1850 Kelvin.

9. A method of operating an LED lighting system comprising:
   providing:
      a first LED light source;
      a second LED light source; and
      a third LED light source, wherein:
         each of the first LED light source, the second LED light source, and the third LED light sources are selected with different spectral power distribution (SPD) curves;
         the first, second, and third LED light sources have the following properties:
            $1.63 \leq \gamma_1 \leq 1.79$ for the first LED light source,
            $3.6 \leq \gamma_2 \leq 3.8$ for the second LED light source, and
            $10.2 \leq \gamma_3 \leq 11.6$ for the third LED light source,
         where $S(\lambda)$ is a function of spectral power versus a wavelength of an LED light source,
         I1 is $\{Max[S(\lambda)]\}$ in a wavelength range of 400 to 500 nm,
         I2 is $\{Min[S(\lambda)]\}$ in a wavelength range of 420 to 550 nm,
         I3 is $\{Max[S(\lambda)]\}$ in a wavelength range of 500 to 700 nm,
         $\gamma_1 = I_3/I_1$ for the first LED light source,
         $\gamma_2 = I_3/I_1$ for the second LED light source, and
         $\gamma_3 = I_3/I_1$ for the third LED light source; and
         the selected SPD curves together model a dimming color curve that is characteristic of an incandescent light source when the first LED light source, the second LED light source, and the third LED light sources are driven on first, second, and third channels, respectively, at predefined power ratios that correspond to predefined dimming levels over a dimming region of the dimming color curve; and
      controlling current supply on the first, second, and third channels to the first LED light source, the second LED light source, and the third LED light source respectively at a power ratio from the predefined power ratios according to a selected dimming level, wherein a color rendering index is 80 or greater over the dimming region of the dimming color curve for a combination of the first LED light source, the second LED light source, and the third LED light source.

10. The method of claim 9, wherein the dimming color curve is defined by the following equation:

$$CCT = 2920 + 396 \ln(x) + 88.7 \ln(x)^2 + 11.6 \ln(x)^3$$

where CCT is a color correlated temperature, and x is a dim percentage.

11. The method of claim 9, wherein the first LED light source, the second LED light source, and the third LED light sources and their associated first, second, and third channels have the following properties:
   $20 \leq \alpha_1 \leq 35$ and $35 \leq \beta_1 \leq 58$ for the first LED light source on the first channel,
   $12.8 \leq \alpha_2$ 17.85 and $46 \leq \beta_2 \leq 66$ for the second LED light source on the second channel, and
   $7.7 \leq \alpha_3 \leq 13.7$ and $80 \leq \beta_3 \leq 155$ for the third LED light source on the third channel,
   where
   $\alpha_1 = I_1/I_2$ and $\beta_1 = I_3/I_2$ for the first LED light source on the first channel,
   $\alpha_2 = I_1/I_2$ and $\beta_2 = I_3/I_2$ for the second LED light source on the second channel, and
   $\alpha_3 = I_1/I_2$ and $\beta_3 = I_3/I_2$ for the third LED light source on the third channel.

12. The method of claim 11, wherein
   $\alpha_1 = 25$, $\beta_1 = 42$, or $\gamma_1 = 1.73$ on the first channel,
   $\alpha_2 = 15$, $\beta_2 = 55$, or $\gamma_2 = 3.65$ on the second channel, or
   $\alpha_3 = 9.5$, $\beta_3 = 103$, or $\gamma_3 = 10.8$ on the third channel.

13. The method of claim 9, wherein the first, second, and third LED light sources and their associated first, second, and third channels have the following properties:
   $\alpha_1 : \alpha_2 : \alpha_3 = $ (from 2.3 to 3.8):(from 1.2 to 2.1):1,
   $\beta_1 : \beta_2 : \beta_3 = $ (from 0.35 to 0.52):(from 0.41 to 0.72):1, and
   $\gamma_1 : \gamma_2 : \gamma_3 = $ (from 0.13 to 0.17):(from 0.31 to 0.36):1,
   where
   $\alpha_1 = I_1/I_2$ and $\beta_1 = I_3/I_2$ for the first LED light source on the first channel,
   $\alpha_2 = I_1/I_2$ and $\beta_2 = I_3/I_2$ for the second LED light source on the second channel, and
   $\alpha_3 = I_1/I_2$ and $\beta_3 = I_3/I_2$ for the third LED light source.

14. The method of claim 9, wherein the first, second, and third LED light sources and their associated first, second, and third channels have the following properties:
   $20 \leq \alpha_1 \leq 35$ and $35 \leq \beta_1 \geq 58$ for the first LED light source,
   $7.7 \leq \alpha_2$ 13.7 and $80 \leq \beta_2 \leq 155$ for the second LED light source
   where
   $\alpha_1 = I_1/I_2$, $\beta_1 = I_3/I_2$ and $\gamma_1 = I_3/I_1$ on the first channel, and
   $\alpha_2 = I_1/I_2$ and $\beta_2 = I_3/I_2$ on the second channel.

15. The method of claim 9, wherein a color rendering index Ra is greater than 90 over the dimming region of the dimming color curve for the combination of the first, second, and third LED light sources with one of the first, second, and third LED light sources on one channel having an Ra greater than 90 and the other two of the first, second, and third LED light sources on the other channels having an Ra equal to or less than 90.

16. The method of claim 9, further comprising:
   updating the predefined power ratios configured on the LED driver.

17. The method of claim 9, wherein controlling current supply on the first, second, and third channels includes decreasing current on the first channel while increasing the current on the second channel and/or the third channel while dimming the LED lighting system.

18. A method of manufacturing an LED lighting system comprising:
   selecting a first LED light source, a second LED light source, and a third LED light source, wherein:
      each of the first, second, and third LED light sources are selected with different spectral power distribution (SPD) curves;
      a first SPD curve:
         defines the spectral power distribution of the first LED light source; and
         comprises a first local maximum, a second local maximum, and a local minimum;
      the local minimum of the first SPD curve is between the first local maximum of the first SPD curve of and the second local maximum of the first SPD curve;
      a second SPD curve:
         defines the spectral power distribution of the second LED light source; and
         comprises a first local maximum, a second local maximum, and a local minimum;
      the local minimum of the second SPD curve is between the first local maximum of the second SPD curve and the second local maximum of the second SPD curve; and the first, second, and third LED light sources have the following properties:
$1.63 \leq \gamma_1 \leq 1.79$ for the first LED light source,
$3.6 \leq \gamma_2 \leq 3.8$ for the second LED light source, and
$10.2 \leq \gamma_3 \leq 11.6$ for the third LED light source,
where $S(\lambda)$ is a function of spectral power versus a wavelength of an LED light source,
I1 is $\{Max[S(\lambda)]\}$ in a wavelength range of 400 to 500 nm,
I2 is $\{Min[S(\lambda)]\}$ in a wavelength range of 420 to 550 nm,
I3 is $\{Max[S(\lambda)]\}$ in a wavelength range of 500 to 700 nm,
$\gamma_1 = I_3/I_1$ for the first LED light source,
$\gamma_2 = I_3/I_1$ for the second LED light source, and
$\gamma_3 = I_3/I_1$ for the third LED light source; and
the selected SPD curves together modeling a dimming color curve that is characteristic of an incandescent light source when the first, second, and third LED light sources are driven on first, second, and third channels, respectively, at predefined power ratios that correspond to predefined dimming levels over a dimming region of the dimming color curve; and
configuring an LED driver to control the supply of current on the first, second, and third channels to the first, second, and third LED light sources respectively at a power ratio from the predefined power ratios according to a selected dimming level, wherein:
a highest dimming level generates a color temperature less than 3200 Kelvin on the dimming color curve and a lowest dimming level generates a color temperature of more than 1750 Kelvin on the dimming color curve, and
a color rendering index is 80 or greater over the dimming region of the dimming color curve for a combination of the first LED light source, the second LED light source, and the third LED light source.

19. The method of claim 18, wherein the first, second, and third LED light sources and their associated first, second, and third channels have the following properties:
$20 \leq \alpha_1 \leq 35$ and $35 \leq \beta_1 \leq 58$ for the first LED light source,
$12.8 \leq \alpha_2 \leq 17.85$ and $46 \leq \beta_2 \leq 66$ for the second LED light source, and
$7.7 \leq \alpha_3 \leq 13.7$ and $80 < \beta_3 \leq 155$ for the third LED light source,
where
$\alpha_1 = I_1/I_2$ and $\beta_1 = I_3/I_2$ for the first LED light source,
$\alpha_2 = I_1/I_2$ and $\beta_2 = I_3/I_2$ for the second LED light source, and
$\alpha_3 = I_1/I_2$, $\beta_3 = I_3/I_2$ and $\gamma_3 = I_3/I_1$ for the first LED light source.

20. The method of claim 18, wherein the first LED light source, the second LED light source, and the third LED light sources and their associated first, second, and third channels have the following properties:
$20 \leq \alpha_1 \leq 35$ and $35 \leq \beta_1 \geq 58$ for the first LED light source,
$7.7 \leq \alpha_2 \leq 13.7$ and $80 \leq \beta_2 \leq 155$ for the second LED light source, and
the third LED light source is an amber LED light source, where
$\alpha_1 = I_1/I_2$ and $\beta_1 = I_3/I_2$ for the first LED light source and
$\alpha_2 = I_1/I_2$ and $\beta_2 = I_3/I_2$ for the second LED light source.

* * * * *